United States Patent [19]

Vogel et al.

[11] Patent Number: 5,651,945
[45] Date of Patent: Jul. 29, 1997

[54] CARBON BLACK REACTOR AND METHOD OF PRODUCING CARBON BLACK

[75] Inventors: Karl Vogel, Alzenau; Reinhold Meuser, Erfstadt; Armin Wunderlich, Hammersbach, all of Germany

[73] Assignee: Degussa Aktiengesellschaft, Frankfurt am Main, Germany

[21] Appl. No.: 502,638

[22] Filed: Jul. 14, 1995

[30] Foreign Application Priority Data

Jul. 30, 1994 [DE] Germany .......................... 44 27 136.0

[51] Int. Cl.$^6$ .............................. C09C 1/00; C01B 31/02
[52] U.S. Cl. ........................ 422/151; 422/156; 422/225; 422/228; 202/88; 202/87; 423/456
[58] Field of Search ............................ 422/150, 151, 422/156, 225, 228; 201/22, 24; 202/88, 87; 423/456

[56] References Cited

U.S. PATENT DOCUMENTS

| | | | |
|---|---|---|---|
| 2,682,450 | 11/1954 | Sweigart et al. | 23/259.5 |
| 2,781,247 | 2/1957 | Krejci | 23/209.4 |
| 2,851,337 | 9/1958 | Heller | 23/209.4 |
| 3,615,213 | 10/1971 | Shepherd | 23/209.4 |
| 3,642,446 | 2/1972 | Heller | 23/209.4 |
| 3,669,628 | 6/1972 | Latham, Jr. | 23/259.4 |
| 3,915,653 | 10/1975 | Cheng | 422/150 |
| 4,179,494 | 12/1979 | Rothbübr et al. | 422/156 |
| 4,213,939 | 7/1980 | Ruble | 422/151 |
| 4,224,284 | 9/1980 | Cheng | 422/156 |
| 4,228,131 | 10/1980 | Rothbübr et al. | 423/456 |
| 4,320,090 | 3/1982 | Hunt | 422/150 |
| 4,402,929 | 9/1983 | Hunt | 422/150 |
| 4,447,401 | 5/1984 | Casperson et al. | 422/151 |
| 4,550,013 | 10/1985 | Cheng | 422/151 |
| 4,588,557 | 5/1986 | Henderson | 422/108 |
| 4,664,901 | 5/1987 | Henderson | 423/450 |
| 4,692,312 | 9/1987 | Dilbert et al. | 422/151 |
| 4,824,643 | 4/1989 | Gravley et al. | 422/151 |
| 4,904,454 | 2/1990 | Schaefer et al. | 422/151 |
| 5,069,882 | 12/1991 | Jones, Jr. | 422/150 |
| 5,188,806 | 2/1993 | Kuehner et al. | 422/151 |
| 5,252,297 | 10/1993 | Nakai | 422/150 |

FOREIGN PATENT DOCUMENTS

| | | |
|---|---|---|
| 0209901B2 | 1/1987 | European Pat. Off. . |
| 0386655 | 9/1990 | European Pat. Off. . |
| 1244594 | 1/1961 | France . |
| 1244714 | 1/1961 | France . |
| 2317341 | 2/1977 | France . |
| 2136735 | 10/1974 | Germany . |
| 2530371B2 | 5/1981 | Germany . |

Primary Examiner—Nina Bhat
Attorney, Agent, or Firm—Beveridge, DeGrandi, Weilacher & Young, L.L.P.

[57] ABSTRACT

A carbon black reactor having a combustion chamber, a mixing chamber and a reaction chamber positioned along a longitudinal axis of the reactor. The chambers communicate with each other so as to provide a flow path for the hot combustion gases as the combustion gases travel from the combustion chamber, through the mixing chamber and into the reaction chamber. The mixing chamber is designed in the form of an axial narrow area in a dividing wall separating the combustion chamber from the reaction chamber. In addition to the mixing chamber, the combustion chamber and the reaction chamber additionally communicate with each other through at least one bypass bore provided in the dividing wall and positioned radially externally to the mixing chamber and internally to the surface of the combustion chamber. The bypass bores can be either axially aligned so as to be parallel to a central, axial axis of the mixing chamber or inclined. The inclination of the bypass bores can be either in a divergent combustion flow arrangement or a converging combustion flow arrangement. The mixing chamber can either have a constant diameter surface along its length or a surface which narrows in an upstream to downstream direction. The extra-axial bypass bores provide a combustion gas flow, which has not been subjected to the cooling effect of the introduced feedstock, to the reaction chamber in an area radially external to the outlet opening of the mixing chamber.

34 Claims, 3 Drawing Sheets

CARBON BLACK REACTOR AND METHOD OF PRODUCING CARBON BLACK

FIELD OF THE INVENTION

The invention relates to a carbon black reactor for producing carbon black.

BACKGROUND DISCUSSION

Carbon blacks are produced in carbon black reactors in large amounts for a wide variety of different industrial applications. Carbon black reactors generally consist of a combustion chamber, a mixing chamber and a reaction chamber which are arranged along the reactor axis, communicate with each other and form a flow path for the reaction media from the combustion chamber via the mixing chamber to the reaction chamber. In the combustion chamber, a fuel, usually gas or oil, is burned in order to generate a high temperature with the aid of a burner under the addition of pre-heated combustion air. A usually liquid, carbon-containing raw carbon black material, e.g., a carbon black oil is sprayed into the hot combustion gases, at which time a part of the raw carbon black material burns and the rest is converted by thermal splitting into carbon black and residual gas. E.g., hydrocarbons of a highly aromatic composition such as coal tar oils, ethylene cracker residues and other petroleum products serve as raw carbon black material.

The raw carbon black material or hydrocarbon feedstock is usually sprayed or injected into a mixing chamber designed as a narrow area in order to achieve an intensive mixing of the raw carbon black material with the hot combustion gases by means of the great turbulence of the combustion gases prevailing there. This mixture then enters into the carbon black reaction chamber, which usually has a cross-section which is widened out in comparison to the narrow area. The actual carbon black formation process takes place in this reaction chamber from nucleation with subsequent growth of the carbon black nuclei and is stopped downstream by spraying in water.

The physical and chemical processes which occur during the carbon black formation are very complex. The heat of the combustion gases is transferred very rapidly to the atomized droplets of the raw carbon black material and results in a more or less complete evaporation of the droplets. A part of the evaporated raw carbon black material is burned in the excess combustion air. Under these conditions the molecules of the raw carbon black material are dehydrogenated and form carbon black nuclei. The nucleation is essentially limited to a limited spatial range, the nucleation zone, within the reaction chamber directly behind the mixing chamber. In the downstream area of the reaction chamber the carbon black nuclei grow to ball-shaped and needle-shaped primary particles. The primary particles, for their part, congregate under the reactive conditions in the reaction chamber to larger aggregates which are firmly connected to each other. The manner of this congregation is commonly designated as the structure of the carbon black.

Various analytic test methods are utilized in order to characterize the carbon blacks. The most important test methods for the applications are the measuring of the iodine adsorption according to ASTM D 1510 as a measure for the specific surface of non-oxidized carbon blacks, the determination of the CTAB surface according to ASTM D 3765 as well as the DBP absorption according to ASTM D 2414 for measuring carbon black structure. The aggregate dimensions of the carbon blacks are determined according to ASTM D 3849 by image analysis of electron microscope pictures.

Further important characteristic quantities of the carbon blacks are the amount of volatile (ASTM D 1620) and the amount of extractable components (DIN 53553) as well as the pH (ASTM D 1512).

The characteristic quantities cited determine the properties of use of the materials modified with these carbon blacks, e.g., the properties of use of rubber or of paints. The different requirements of use can be met only by coordinating the carbon black properties with the particular case of use. Accordingly, modern carbon black reactors must be capable of producing different carbon black qualities by suitably changing their operating parameters.

The significant influencing variables for carbon black formation are the excess of air and of oxygen in the combustion gases, the temperature of the combustion gases and the reaction time or dwell time from the mixing in of the raw carbon black material into the combustion gases until the stopping of the reaction by quenching with water, which is sprayed into the downstream area of the reaction chamber by means of a quenching nozzle. The temperature of the combustion gases is usually adjusted to a value between 1200° and 1900° C. The higher the temperature is, the smaller the formed carbon black aggregates become. The dwell time also influences the distribution of the aggregate size. It can be adjusted in known carbon black reactors by means of flow rate and positioning of the quenching nozzle between 1 ms and 1 s.

SUMMARY OF THE INVENTION

The present invention is directed at providing a carbon black reactor which makes available to one skilled in the art a further degree of freedom for influencing the carbon black properties, especially the distribution of the particle size.

A further object of the invention is the providing of a method of producing carbon black which takes advantage of the added possibilities, given by the novel reactor, of influencing the carbon black properties.

The present invention starts from a reactor type like that disclosed in DE-AS 25 30 371. The reactor of the '371 reference comprises, along the reactor axis, a combustion chamber, a mixing chamber and a reaction chamber which communicate with each other and together comprise a flow path for the hot combustion gases that extends from the combustion chamber, through the mixing chamber to the reaction chamber. The mixing chamber is arranged in the form of an axial narrow area in a separating wall located between the combustion chamber and the reaction chamber. The combustion chamber comprises inlet openings upstream from the mixing chamber for the supply of combustion air as well as a burner arrangement. One or several spray or injection nozzles for raw carbon black material are provided in the mixing chamber. For stopping the reaction of carbon black formation, the reaction chamber comprises at least one quenching nozzle downstream from the mixing chamber for spraying in water into the carbon black-charged gas flow.

The carbon black reactor of the present invention is characterized, in comparison to the above described reactor of the '371 reference, in that the combustion chamber and the reaction chamber communicate with one another not only by way of the mixing chamber but also by way of at least one extra-axial, bypass bore formed in the dividing wall at a position radially external to the mixing chamber. As a result of this construction, the flow of hot combustion gases flowing from the combustion chamber to the reaction chamber is divided into a central current flowing through the mixing chamber and into at least one bypass current flowing through a bypass bore. Preferably, there are a plurality of equally spaced bypass bores positioned along a concentric circle extending about the inlet of the mixing chamber.

With the arrangement of the present invention, the hot combustion gases and, if necessary, excess air can pass directly from the combustion chamber through the bypass bore(s) without detouring through the mixing chamber. Here any still not-consumed oxygen component of the combustion air results in a partial post-combustion of the raw carbon black material. Since the bypass bores extend axially through the dividing wall and are arranged radially external to the mixing chamber, a sharply inhomogeneous temperature profile is generated in the reaction chamber perpendicular to the reactor central axis. The temperatures are the lowest on the reactor axis since the waste combustion gases are cooled off by the spraying in of the carbon black oil. On the other hand, in the edge area the temperature is raised by the hot combustion gases and, optionally, by an additional post-combustion.

The arrangement of the present invention thus results in a high-temperature zone being formed in the edge area of the reaction chamber behind the mixing chamber by means of which zone the nucleation zone, which is important for the properties of the finished carbon black product, can be expanded. The nucleation zone is located in the reaction chamber directly behind, i.e., downstream from the mixing chamber and can extend, depending on the location of the mixing in of the raw carbon black material, into the mixing chamber.

The terms "mixing chamber" and "reaction chamber" selected here therefore do not mean that the carbon black formation process can actually be sharply divided into the steps "mixing in of the raw carbon black material into the hot combustion gases" and "carbon black formation". Rather, the carbon black formation begins in the mixing chamber already shortly after the spraying in or injection of the carbon black feedstock oil into the combustion gases and is then continued in the reaction chamber.

In conventional reactors the nucleation zone is limited to a more or less narrow spatial area around the reactor axis. As a result of the bypass bores of the present invention, the nucleation zone can be expanded over almost the entire cross-section of the reaction chamber. Whereas in conventional carbon black reactors there is the danger that a certain percentage of the droplets of the raw carbon black material leave the nucleation zone in a radial direction and settle on the wall of the reaction chamber under formation of coke, this danger is considerably reduced in the reactor of the invention as a consequence of the externally located high-temperature zone.

Customarily, natural gas, oil or other fuels are burned in air in order to generate the hot combustion gases. The combustion can be carried out hypostoichiometrically, stoichiometrically or also hyperstoichiometrically by regulating the air/fuel ratio. The temperature of the combustion gases is decisively dependent on how the air/fuel ratio is adjusted.

The combustion is usually carried out hyperstoichiometrically, that is, with an excess of air. The more the air/fuel ratio approaches the stoichiometric value, the hotter the combustion gases become. In stoichiometric combustion peak temperatures of up to 2200° C. are attained. However, the work is normally carried out with an excess of air and combustion temperatures between 1200° and 1900° C. The excess air is utilized thereby, as already described, for a defined post-combustion in the reaction chamber.

Thus, the selection of the type of combustion and of direct injection of the hot combustion gases into the peripheral areas of the reaction chamber can vary the temperature in these areas within wide limits and significantly broaden the high-temperature zone important for the nucleation.

The spray or injection nozzles for mixing in the raw carbon black material into the current of the hot combustion gases can be arranged along the mixing chamber in such a manner that they mix the raw carbon black material from the wall of the mixing chamber radially inward into the current of the combustion gases. For this purpose the spray or injection nozzles can be run with their necessary supply lines through radial bores in the dividing wall up to the mixing chamber. These radial bores would be positioned in a non-interfering relationship with respect to the axially extending shunts or bypass bores. The nozzles can be arranged distributed along the mixing chamber and on the circumference of the mixing chamber. The raw carbon black material can also be mixed into the combustion gases with a component directed upstream or downstream by means of appropriately aligned nozzles.

However, the raw carbon black material is preferably mixed into the combustion gases by means of an axial injector lance at the head of which one or more spray or injection nozzles are located.

To this end the injector lance is run through an inlet opening of the combustion chamber into the mixing chamber and can be shifted in an axial direction in order to position the nozzle(s) in front of, within or shortly behind the mixing chamber.

The addition of the raw carbon black material preferably takes place at a position inside the mixing chamber. This forces the hot combustion gases to flow through the annular conduit formed by the wall of the mixing chamber and of the axially arranged injector lance from the combustion chamber to the reaction chamber. The gas flow in this annular conduit is highly turbulent. The flow rates are between 400 m/sec and 900 m/sec. The raw carbon black material is injected into this highly turbulent gas flow and intensively mixed as a consequence of the turbulence. The spray or injection nozzles can be arranged on the head of the injector lance in such a manner that they mix the raw carbon black material in a radial direction outward and/or axially in a downstream direction into the hot combustion gases.

The two alternative procedures for mixing in the raw carbon black material, the mixing in from the walls of the mixing chamber inward and the mixing in by means of the injector lance, can also be combined.

Both single-substance and two-substance nozzles can be used as spray or injection nozzles. In the case of two-substance nozzles water vapor, hydrogen as well as inert and/or carbon-containing gases can be used in addition to the raw carbon black material.

The mixing chamber can be provided with different longitudinal cross-sections. In the simplest case this concerns providing the mixing chamber with a cylindrical chamber that has a constant cross-section of flow in the axial direction. It is advantageous to use a mixing chamber with a cross-section of flow which narrows in cross-section in a downstream direction extending from the combustion chamber to the reaction chamber. There can be another widening out of the mixing chamber shortly before the reaction chamber; however, it is preferable to use an abrupt cross-sectional change at the transition from the narrowest cross-section of the mixing chamber to the larger cross-section of the reaction chamber. This generates high turbulences of the combustion gases charged with raw carbon black material. To this end the reaction chamber exhibits a diameter 2 to 12 times the smallest diameter of the mixing chamber, preferably 5 to 10 times its diameter.

In the case of a mixing chamber with a cross-section converging in an axial direction it becomes possible to influence the central flow of the combustion gases by axially shifting the injector lance and varying therewith the ratio of the secondary or subsidiary flows to the volume or bulk flow of the central flow.

The ratio of the smallest diameter of the mixing chamber to the diameter of the injector lance is preferably in a range between 1.1:1 and 5:1. In order to obtain an optimum mixing of combustion gases and carbon black oil, the length of the mixing chamber or the thickness of the dividing wall between combustion chamber and reaction chamber should be 50 to 500 mm.

It is advantageous if the extra-axial bypass bores are arranged in on one or several concentric circles. The temperature profile which is adjusted in the reaction chamber can be influenced thereby by means of various measures. The decisive factor thereby is the ratio of the flow volume of the combustion gases through the bypass bore(s) to the flow volume of the combustion gases through the mixing chamber.

The ratio of the flow volumes at a given reactor geometry is a function of the area ratio of the sum of the cross-sections of flow of all bypass bores to the area of the narrowest cross-section of flow of the mixing chamber. The area ratio can be selected between 0.1:1 and 10:1 and a value between 1:1 and 10:1 is preferred.

As has already been explained, the ratio of the flow volumes, even at a given reactor geometry, can still be varied by means of suitable positioning of the injector lance in the mixing chamber. However, the shifting of the injector lance also has a direct influence on the carbon black formation process. In a particular embodiment of the reactor, the ratio of the flow volumes is therefore varied by using ceramic plugs, (e.g., threaded plugs or stoppers) with which the cross-sections of flow of the bypass bores can be continuously decreased from a maximum value or completely closed. The plugs can be run, e.g., with the aid of lances, which are preferably parallel to the reactor axis, through the combustion chamber to the openings of the bypass bores in the dividing wall. The plugs of all bypass bores can be actuated synchronously or independently of each other thereby. By means of an independent actuation of the plugs, e.g., asymmetries in the reaction chamber can be compensated or produced in order to achieve certain effects.

A further influencing of the temperature profile in the reaction chamber is achieved in that the bypass bores can be inclined in relation to the reactor axis. The angle of inclination should be in a range between ±45° of the reactor axis. As a result thereof, the extra-axial gas currents are directed either more toward the outer edge area of the reaction chamber or more toward the center of the reaction chamber. All bypass bores can be arranged with the same inclination, e.g., all positioned for forming a diverging combustion gas flow into the reaction chamber or all positioned for forming a converging combustion gas flow into the reaction chamber. Also, various combinations of inclination can be utilized, e.g., every other bypass bore positioned on a concentric circle being at a positive angle and the adjacent bypass bores being at a negative angle or a series of bypass bores in one concentric ring being inclined in one direction and a second series on another concentric ring being non-inclined or at an opposite inclination.

A further degree of freedom for adjusting the temperature profile in the reaction chamber is given to one of ordinary skill in the art by virtue of the fact that the combustion air can be conducted to the combustion chamber in different manners.

As one example, the combustion air can be introduced tangentially into the combustion chamber in order to generate a strong spin flow. A spin-free flow is maintained if the combustion air is axially conducted to the combustion chamber.

Furthermore, it has proven to be advantageous to provide further secondary spray or injection nozzles for raw carbon black material or other substances in the wall of the reaction chamber upstream from the quenching nozzle. These substances can be gaseous hydrocarbons, fine carbon black or coal dispersions and/or inert substances such as, e.g., nitrogen gas. These substances can be sprayed or injected either radially inward or with a component which is directed upstream or downstream into the hot, peripheral areas of the reaction chamber produced by the post-combustion.

BRIEF DESCRIPTION OF THE DRAWINGS

FIG. 1 shows, in axial cross-section, a carbon black reactor with bypass bores and axial supply of the combustion air.

FIG. 2 shows, in axial cross-section, a carbon black reactor with bypass bores and tangential supply of the combustion air.

FIG. 3 shows, in radial cross-section, a front elevation view of an alternate embodiment of the dividing wall extending between the combustion chamber and the reaction chamber.

FIG. 4 shows, in a cutaway axial cross-section, the mixing chamber with a cross-section which narrows down conically in the direction of flow of the combustion gases.

DETAILED DESCRIPTION OF THE PREFERRED EMBODIMENTS

Figure 1:
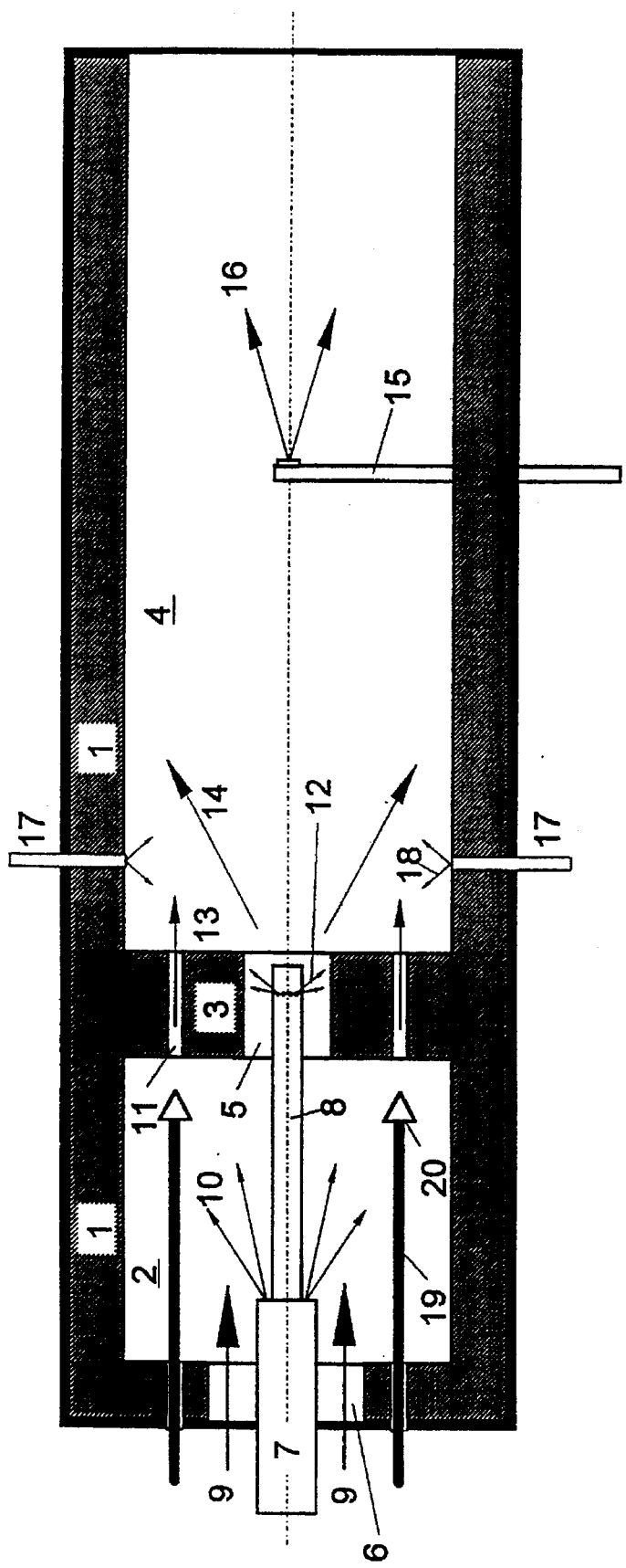
FIGS. 1 to 4 show various embodiments and details of carbon black reactors in accordance with the invention.

FIG. 1 shows the longitudinal cross-section of a carbon black reactor 1 in accordance with the invention with axial supply of the combustion air. The combustion chamber 2, mixing chamber and reaction chamber 4 are provided with a highly fire-resistant brick lining preferably based on aluminum oxide or zirconium oxide. The combustion chamber and the reaction chamber are separated from each other by dividing wall 3. A communication between both chambers is established by mixing chamber 5 executed as a centrally positioned axial bore in wall 3. Combustion air and fuel are supplied to the carbon black reactor through axial opening 6 located upstream from the mixing chamber in the combustion chamber. Axially arranged injector lance 8 is used to spray raw carbon black material 12 into the reactor and is illustrated in FIG. 1 as being in one preferred position wherein the raw carbon black material is sprayed in mixing chamber 5.

Fuel 10 passes via burner 7, which in this instance surrounds injector lance 8 in the form of a casing, into combustion chamber 2. Combustion air 9 is supplied axially and free of spin to the combustion chamber via the remaining, free cross-section of opening 6.

The hot combustion gases generated by the burner pass via the annular conduit formed between the axial injector lance and the wall of mixing chamber 5 into reaction chamber 4. The spray and/or injection nozzles for the raw carbon black material are distributed in the head area of the injector lance on the circumference of the lance and mix the raw carbon black material into the combustion gases flowing through the annular conduit.

The abrupt cross-sectional change at the transition from mixing chamber 5 into reaction chamber 4 causes the mixture of raw carbon black material and hot combustion gases 14 to be additionally vigorously swirled. The actual carbon black formation then takes place in reaction chamber 4. In order to stop the carbon black formation water 16 is sprayed into the reaction chamber via quenching nozzle 15.

In order to adjust the temperature profile in reaction chamber 4 the invention provides that bypass bores 11 are provided in dividing wall 3 between the combustion chamber and the reaction chamber. These bypass bores 11 make it possible for the hot combustion gases to pass without detour through mixing chamber 5 into reaction chamber 4. Whereas the combustion gases passing through mixing chamber 5 are cooled down by the spraying in of the raw carbon black material, combustion gases 13, which pass through the short-circuit bores and directly into reaction chamber 4, retain their temperature almost unchanged. Combustion gases 13 contain still unconsumed oxygen, depending on how the combustion was conducted, which results in a partial post-combustion of the raw carbon black material in the reaction chamber. As a result of these events, a temperature profile develops in the reaction chamber which is transverse to the reactor axis and rises from the reactor axis to the reactor wall.

Additional raw carbon black material or other substances 18 can be introduced into the hot peripheral areas of the reaction chamber through supplemental spray or injection nozzles 17 running through the wall of the reaction chamber. This presents an additional means for varying the temperature profile just downstream from the outlet of the mixing chamber into the reaction chamber.

Axially shiftable plug lances 19 are introduced into the combustion chamber in order to regulate the flow volume through the bypass bores. Conical ceramic plugs 20 are located at the ends of the lances. The flow volume through the bypass bores can be throttled or completely suppressed by bringing the plugs up to the openings of the bypass bores in the dividing wall. As shown, the plug lances have a central axis which passes through a center point of a respective one of the bypass bore inlets.

Injector lance 8 and plug lances 19 can be water-cooled for protection against the hot combustion gases.

Figure 2:
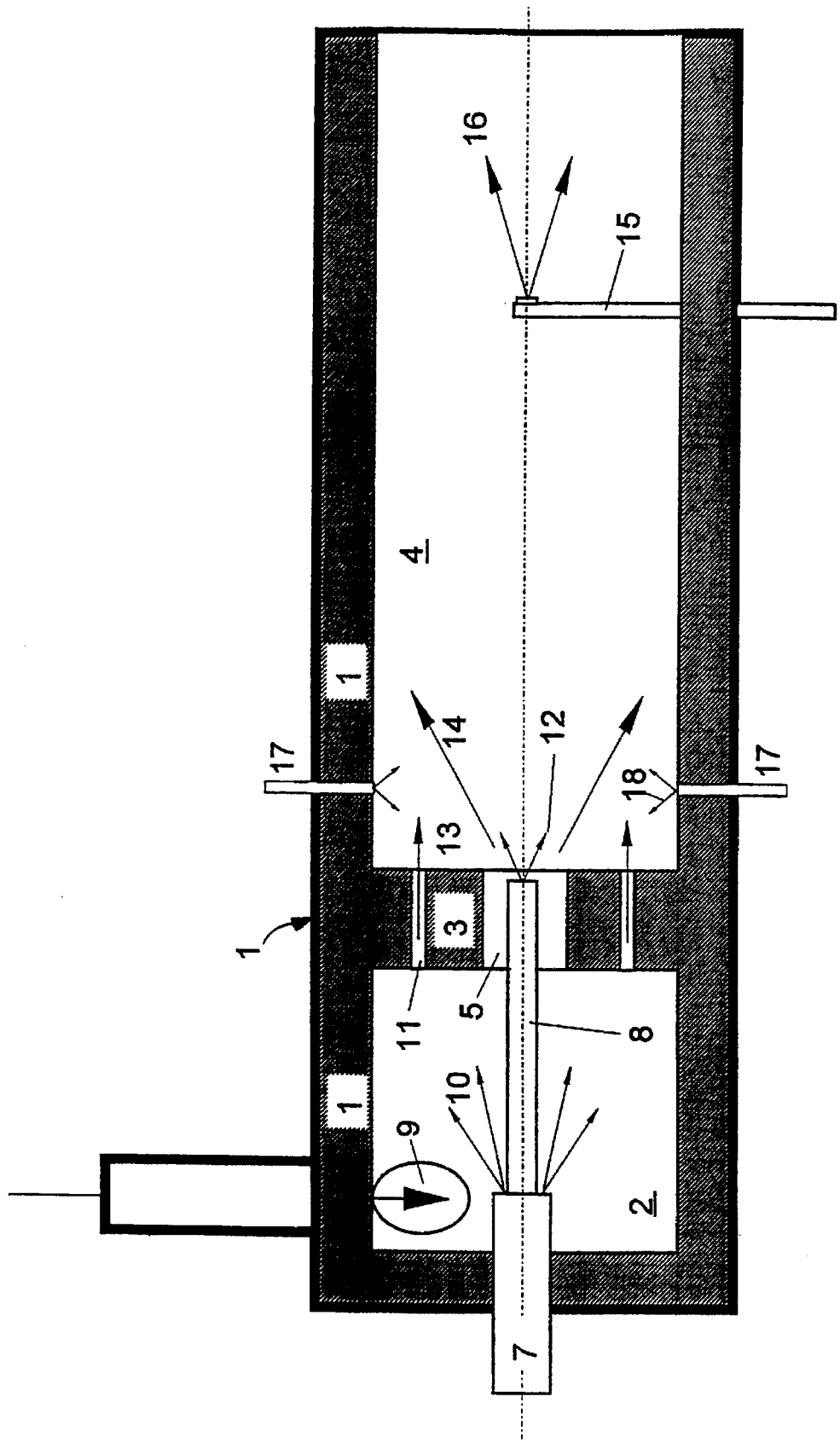

FIG. 2 shows a reactor similar to that in FIG. 1. However, the supply of combustion air 9 does not occur axially but rather tangentially transversely to the reactor axis. This imparts a strong spin to the combustion gases. Moreover, in this embodiment of the carbon black reactor the raw carbon black material 12 is mixed in axial direction into the hot combustion gases. To this end the spray or injection nozzles are located directly on the head of the injector lance 8.

Figure 3:
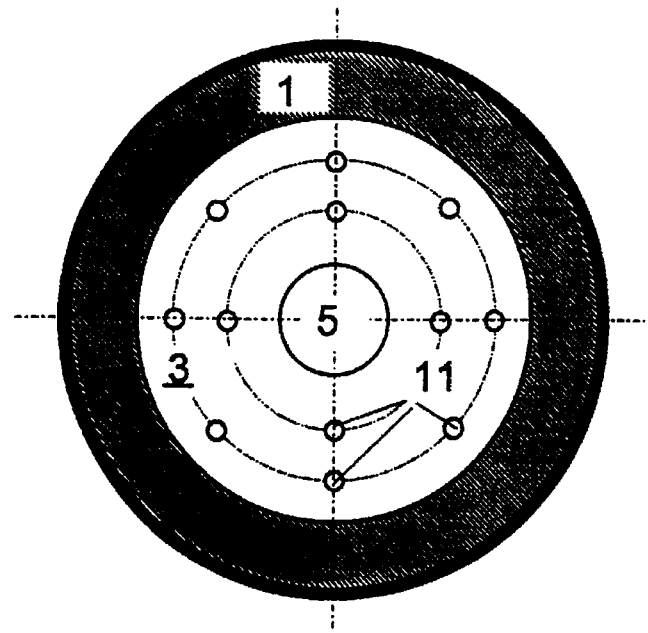

FIG. 3 shows a front elevational view of an alternate embodiment of the dividing wall 3 positioned between the combustion chamber and the reaction chamber. In this embodiment of the reactor of the invention twelve, bypass bores 11 are provided which are arranged in two concentric circles with different diameters.

Figure 4:
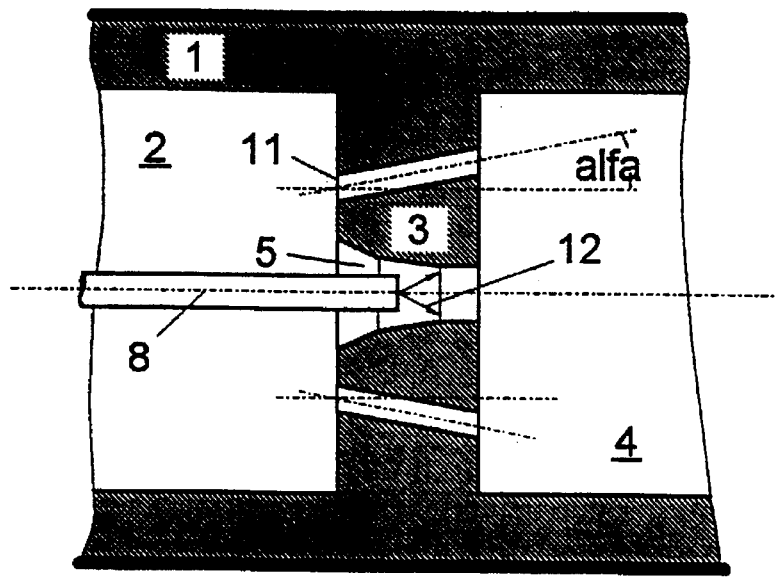

FIG. 4 shows a cross-sectional view of dividing wall 3 between the combustion chamber and the reaction chamber for another embodiment of the invention. Bypass bores 11 are inclined in this embodiment of the reactor at an angle to the reactor axis. The selection of the angle of inclination is a function of the requirements regarding the temperature profile in the reaction chamber. The bypass bores can be inclined either outwardly or inwardly, that is, angle $\alpha$ can assume either positive or negative values (a positive inclination providing a divergent gas flow and a negative inclination a convergent gas flow). As previously noted, it is also possible to combine bores with different inclinations with each other in one reactor.

The embodiment of the reactor in FIG. 4 exhibits a special longitudinal profile of mixing chamber 5. The cross-section of the mixing chamber decreases from the combustion chamber toward the reaction chamber. It is possible, due to this longitudinal profile, to change the ratio of the flow volume of the combustion gases flowing through the bypass bores to the combustion gases flowing through the mixing chamber into the reaction chamber by axially shifting the injector lance for the raw carbon black material. The selection of the suitable longitudinal profile of the mixing chamber depends on the desired control characteristic for these flow volume adjustments.

The following dimensions were used in a concrete embodiment of the reactor according to FIG. 1:
Diameter of the combustion chamber: 700 mm
Length of the combustion chamber: 650 mm
Diameter of the inlet opening in the combustion chamber: 350 mm
Diameter of the burner tube: 100 mm
Diameter of the injector lance: 70 mm
Thickness of the dividing wall: 250 mm
Diameter of the mixing chamber on the side of the dividing wall facing the combustion chamber: 120 mm
Diameter of the mixing chamber on the side of the dividing wall facing the reaction chamber: 80 mm
Number of bypass bores: 12
Diameter of the bypass bores: 50 mm
Diameter of the concentric circle of the bypass bores: 500 mm
Inclination of the bypass bores: inward by 10°
Diameter of the reaction chamber: 900 mm German priority application P 4427136.0 having a filing date of Jul. 30, 1994 is incorporated herein by reference.

Although the present invention has been described with reference to preferred embodiments, the invention is not limited to the details thereof. Various substitutions and modifications will occur to those of ordinary skill in the art, and all such substitutions and modifications are intended to fall within the spirit and scope of the invention as defined in the appended claims.

What is claimed is:

1. A reactor for the production of carbon black, comprising a combustion chamber, a mixing chamber and a reaction chamber positioned along an axis of the reactor, said chambers communicating with each other so as to form a flow path for hot combustion gases traveling from the combustion chamber via the mixing chamber to the reaction chamber, said mixing chamber being designed in the form of an axial narrow area in a dividing wall separating the combustion chamber and the reaction chamber from one another, said combustion chamber comprising at least one inlet opening positioned upstream from the mixing chamber for supplying an oxygen-containing gas, said reactor further comprising a burner arrangement for producing combustion gases in said combustion chamber, and one or several raw carbon black material spray or injection nozzles are provided in said mixing chamber, and, in said reaction chamber, at least one quenching nozzle for water is located downstream from the mixing chamber for stopping the reaction of carbon black formation, and said combustion chamber and the reaction chamber communicating with one another by way of the mixing chamber and, in addition, by way of at least one extra-axially arranged bypass or shunt bore provided in said dividing wall.

2. The reactor according to claim 1, wherein one or more spray or injection nozzles for the raw carbon black material are located on the head of an axially extending injector lance which is shiftable in an axial direction to a position in front of, inside or shortly behind the mixing chamber in order to position the one or more spray or injection nozzles relative to the direction of flow of the combustion gases and that the one or more spray or injection nozzles mix the raw carbon black material in a radial direction outward and/or axially in a downstream direction into the current of the hot combustion gases.

3. The reactor according to claim 2, wherein the mixing chamber exhibits a cross-section of flow which narrows in a direction extending downstream from the combustion chamber to the reaction chamber.

4. The reactor according to claim 1, wherein the mixing chamber exhibits a cross-section of flow which is constant in the axial direction.

5. The reactor according to claim 1, wherein the mixing chamber exhibits a cross-section of flow which narrows in a direction extending downstream from the combustion chamber to the reaction chamber.

6. The reactor according to claim 1, wherein there are a plurality of bypass bores that extend through said dividing wall and are arranged concentrically on one or more concentric circles extending around the mixing chamber, and an axis of the bypass bores is inclined within a range of ±45° relative to the reactor axis.

7. The reactor according to claim 1 characterized in that an area ratio of the sum of the cross-sectional areas of all bypass bores to the cross-sectional area of the narrowest cross-section of the mixing chamber is between 0.1:1 and 10:1.

8. The reactor according to claim 7 wherein said area ratio is between 1:1 and 10:1.

9. The reactor according to claim 1 further comprising at least one plug for reducing or completely closing off a corresponding bypass bore.

10. The reactor according to claim 9 wherein there are a plurality of bypass bores in said dividing wall arranged radially externally to said mixing chamber, and said reactor includes a plurality of said plugs as well as plug lances extending from said plugs, said plug lances extending into said combustion chamber through lance inlets formed in said reactor, and said plug lances being axially adjustable in said combustion chamber such that the flow path of the bypass bores can be reduced or closed off by said plugs.

11. The reactor according to claim 1 further comprising supplemental spray or injection nozzles for introducing carbon-containing raw carbon black materials, fine carbon black or coal dispersions and/or inert gases, said supplemental spray or injection nozzles being provided in the wall of the reaction chamber upstream from the quenching nozzle, and said supplemental spray or injection nozzles being directed upstream or downstream either radially inward or at an angle to the reactor axis of less than 90°.

12. The reactor according to claim 1 wherein said one or more spray or injection nozzles for raw carbon black material are supported on an injector lance extending axially within said reactor, and a ratio of a smallest diameter of the mixing chamber to a diameter of the injector lance is in a range between 1.1:1 and 5:1 and the dividing wall between said combustion chamber and said reaction chamber being between 50 and 500 mm thick.

13. A method of producing carbon black in a carbon black reactor by generating a current of hot combustion gases in a combustion chamber of said reactor, conducting the hot combustion gases along an axis of flow extending from the combustion chamber through a mixing chamber and into a reaction chamber of said reactor, the cross-section of flow of said mixing chamber being reduced in comparison to that of the combustion chamber and the reaction chamber, mixing raw carbon black material into the flow of the combustion gases before, inside or behind the mixing chamber by spraying in or injecting the raw carbon black material, said method further including stopping the formation of carbon black downstream in the reaction chamber by spraying in a cooling medium, said method further comprising dividing the combustion gases, before said combustion gases enter into the mixing chamber, into a central current and one or more secondary currents, the central current being conducted through the mixing chamber and charged with raw carbon black material and the secondary current or currents being supplied to the peripheral areas of the central current after the expansion of the central current in the reaction chamber.

14. The method according to claim 13 wherein said secondary currents pass through bypass bores extending axially through said dividing wall and positioned radially external to said mixing chamber.

15. The method according to claim 13, wherein the secondary currents are distributed concentrically on one or more concentric circles around the axis of flow and are supplied to the central current in the reaction chamber at an angle between ±45° to the axis of flow.

16. The method according to claim 13, characterized in that the ratio of the sum of the volume of the secondary currents to the volume of the central current is between 0.1:1 and 10:1.

17. The method according to claim 16 wherein the sum of the flow volume of the secondary currents to the flow volume of the central current is between 1:1 and 10:1.

18. The method according to claim 13 further comprising adjusting the flow volume of the secondary currents between 0 and a maximum flow value.

19. The method according to claim 18, wherein the flow volume of the secondary currents are independently adjustable between 0 and the maximum value of flow through the positioning of respective plugs.

20. The method according to claim 13, further comprising supplying carbon-containing raw carbon black materials, fine carbon black or coal dispersions and/or inert gases to one or more peripheral areas of the carbon black-charged combustion gases in the reaction chamber before the stopping of the carbon black formation.

21. A reactor for producing carbon black,
said reactor having a combustion chamber, a mixing chamber and a reaction chamber positioned along an axial axis of said reactor, said combustion, mixing and reaction chambers communicating with each other so as to form a flow path for hot combustion gases traveling within the reactor from the combustion chamber through the mixing chamber and into the reaction chamber,
said mixing chamber being designed as an opening in a dividing wall separating the combustion chamber and the reaction chamber from one another,
said combustion chamber comprising at least one inlet opening positioned upstream from the mixing chamber for supplying an oxygen-containing gas to said combustion chamber, said reactor further comprising a burner for combustion of both said oxygen containing gas and a fuel introduced to said burner so as to produce combustion gases in said combustion chamber, said reactor further comprising a raw material injection assembly for introducing carbon black raw material into contact with said combustion gases, and said reactor further including at least one bypass shunt or bore provided in said dividing wall radially external to said mixing chamber such that the combustion chamber and the reaction chamber communicate with one another both by way of said bypass shunt and the mixing chamber.

22. The reactor according to claim 21 wherein said mixing chamber is a centrally positioned passageway provided in said dividing wall and there are a plurality of bypass shunts arranged along a first concentric circle extending about an inlet opening of said mixing chamber.

23. The reactor according to claim 22 wherein the plurality of bypass shunts provided in said dividing wall are evenly spaced along said first concentric circle.

24. The reactor according to claim 23 wherein there are also a plurality of shunts provided in said dividing wall that are spaced along a second concentric circle having a diameter greater than that of said first concentric circle and less than that of said combustion chamber.

25. The reactor according to claim 21 wherein said raw material introduction assembly includes at least one raw material injection lance extending parallel with the axial axis of said reactor and having an outlet for placing raw carbon black material into contact with said combustion gases passing through said mixing chamber.

26. The reactor according to claim 25 wherein said outlet includes a spray nozzle, said lance being axially shiftable and extendable into said mixing chamber.

27. The reactor according to claim 25 wherein said raw material introduction assembly further includes at least one supplemental raw material introduction conduit extending radially through a wall of said reactor into at least one of said mixing chamber and reaction chamber.

28. The reactor according to claim 21 wherein one or more of said bypass shunts extend at an incline to the axial central axis of said mixing chamber.

29. The reactor according to claim 28, wherein said mixing chamber narrows in an upstream to downstream direction.

30. The reactor according to claim 21 wherein said reactor includes a tangential inlet for said oxygen containing gas so as to provide a swirl flow in said combustion chamber.

31. The reactor according to claim 21 wherein there are a plurality of bypass shunts arranged along a concentric circle having a diameter greater than a maximum diameter of said mixing chamber, and said combustion chamber including a plurality of axial openings formed in an end wall of said combustion chamber, said burner extending through one of said axial openings, and said reactor further comprising plug assemblies with each plug assembly including an elongated support member with a plug head, said elongated support members extending through a plurality of said axial openings which are arranged so as to share a common central axis with respective inlet opening of said bypass shunts, and said support members being axially shiftable within said axial openings such that flow of a combustion gas through said bypass shunts can be individually partly or completely restricted.

32. The reactor according to claim 21, wherein said at least one bypass bore or shunt extends obliquely to the central axis of said mixing chamber.

33. The reactor according to claim 21, wherein there are a plurality of bypass bores or shunts formed in said dividing wall and a plurality of through-holes in a combustion chamber wall of said reactor defining an upstream end of said combustion chamber, and said through-holes being axially aligned with inlet openings of said bypass bores or shunts, and said reactor further comprising a plurality of plugs dimensioned to close off the inlets of said bypass bores or shunts and plug supports extending into said combustion chamber and slidingly supported within the through-holes in the combustion chamber wall.

34. The reactor according to claim 21, wherein there are a plurality of bypass bores or shunts that extend axially through said dividing wall.

* * * * *